United States Patent
Park et al.

(10) Patent No.: US 9,822,309 B2
(45) Date of Patent: Nov. 21, 2017

(54) HIGH CARBON CONCENTRATION BIOMASS AND BIOSOLIDS SLURRY PREPARATION USING A HYDRO-THERMAL PRETREATMENT

(75) Inventors: Chan Seung Park, Yorba Linda, CA (US); Joseph Norbeck, Palm Desert, CA (US); Wei He, Portland, OR (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 905 days.

(21) Appl. No.: 13/038,134

(22) Filed: Mar. 1, 2011

(65) Prior Publication Data

US 2011/0162257 A1  Jul. 7, 2011

Related U.S. Application Data

(63) Continuation-in-part of application No. 12/286,165, filed on Sep. 29, 2008, now Pat. No. 8,118,894, which is a continuation-in-part of application No. 11/879,456, filed on Jul. 16, 2007, now abandoned, which is a continuation-in-part of application No. 11/489,299, filed on Jul. 18, 2006, now abandoned, application No. 13/038,134, which is a continuation-in-part of application No. 12/400,640, filed on Mar. 9, 2009, now Pat. No. 8,603,430, which is a continuation-in-part of application No. 10/911,348, filed on Aug. 3, 2004, now Pat. No. 7,500,997, which is a continuation-in-part of application No. PCT/US03/03489, filed on Feb. 4, 2003, said application No. 12/400,640 is a continuation-in-part of application No. 11/879,241, (Continued)

(51) Int. Cl.

| | |
|---|---|
| *C10B 53/02* | (2006.01) |
| *C10J 3/00* | (2006.01) |
| *C10L 5/44* | (2006.01) |
| *C10L 9/00* | (2006.01) |
| *C10L 1/32* | (2006.01) |
| *C10L 9/08* | (2006.01) |

(52) U.S. Cl.
CPC ............... *C10B 53/02* (2013.01); *C10J 3/00* (2013.01); *C10L 1/326* (2013.01); *C10L 5/44* (2013.01); *C10L 9/00* (2013.01); *C10L 9/086* (2013.01); *C10J 2300/0903* (2013.01); *C10J 2300/093* (2013.01); *C10J 2300/0916* (2013.01); *C10J 2300/0973* (2013.01); *Y02E 50/10* (2013.01); *Y02E 50/14* (2013.01); *Y02E 50/30* (2013.01)

(58) Field of Classification Search
CPC .. C10J 3/58; C10J 2200/15; C10J 2300/0909; C10J 2300/0906; C10J 2300/0916; C10J 2300/0923; Y02E 50/10; Y02E 50/15
USPC ........................................................ 48/197 R
See application file for complete search history.

(56) References Cited

U.S. PATENT DOCUMENTS

| | | | |
|---|---|---|---|
| 4,193,206 A * | 3/1980 | Maffet | 34/385 |
| 4,497,637 A * | 2/1985 | Purdy | C10J 3/466 252/373 |

(Continued)

*Primary Examiner* — Matthew Merkling
(74) *Attorney, Agent, or Firm* — Fish IP Law, LLC

(57) ABSTRACT

Provided is a process where the biomass and bisolids are hydrothermally treated under a reductive gas. Using this process a high carbon content pumpable mixture of biomass and biosolid slurry is produced with a viscosity value of less than 1.5.

8 Claims, 2 Drawing Sheets

Related U.S. Application Data filed on Jul. 16, 2007, now Pat. No. 8,268,026, which is a continuation-in-part of application No. 11/489,298, filed on Jul. 18, 2006, now abandoned, application No. 13/038,134, which is a continuation-in-part of application No. 11/879,266, filed on Jul. 16, 2007, now Pat. No. 7,897,649, which is a continuation-in-part of application No. 11/489,308, filed on Jul. 18, 2006, now abandoned.

(60) Provisional application No. 61/309,296, filed on Mar. 1, 2010, provisional application No. 60/355,405, filed on Feb. 5, 2002.

(56) References Cited

U.S. PATENT DOCUMENTS

| | | | | |
|---|---|---|---|---|
| 4,983,296 A | * | 1/1991 | McMahon et al. | 210/603 |
| 5,230,211 A | * | 7/1993 | McMahon et al. | 60/781 |
| 5,250,175 A | * | 10/1993 | Des Ormeaux | 208/356 |
| 2008/0016770 A1 | * | 1/2008 | Norbeck | C10B 53/02 |
| | | | | 48/209 |

* cited by examiner

HIGH CARBON CONCENTRATION BIOMASS AND BIOSOLIDS SLURRY PREPARATION USING A HYDRO-THERMAL PRETREATMENT

CROSS-REFERENCE TO RELATED APPLICATIONS

This application claims the benefit of U.S. Provisional No. 61/309,296 filed on Mar. 1, 2010.

This application is also a continuation-in-part of, and claims the benefit of U.S. patent application Ser. No. 12/286,165, filed on Sep. 29, 2008, which is also a continuation-in-part of U.S. patent application Ser. No. 11/879,456, filed Jul. 16, 2007, which is a continuation-in-part of U.S. patent application Ser. No. 11/489,299 (now abandoned). This application is also a continuation-in-part of, and claims the benefit of, patent application Ser. No. 12/400,640, filed Mar. 9, 2009, which is a continuation-in-part of, and claims the benefit of patent application Ser. No. 11/879,241, filed Jul. 16, 2007, which is a continuation-in-part of patent application Ser. No. 11/489,298, filed Jul. 18, 2006. Patent application Ser. No. 12/400,640 is also a continuation-in-part of, and claims the benefit of, patent application Ser. No. 10/911,348, filed Aug. 3, 2004, which is a continuation-in-part of International Application PCT/US03/03489, with an international filing date of Feb. 4, 2003, which claims the benefit of U.S. Provisional Application Ser. No. 60/355,405, filed Feb. 5, 2002. This application is also a continuation-in-part of, and claims the benefit of, patent application Ser. No. 11/879,266, filed Jul. 16, 2007, which is a continuation-in-part of, and claims the benefit of, application Ser. No. 11/489,308, filed Jul. 18, 2006.

All of the above cited applications are incorporated herein by reference in their entirety.

FIELD OF THE INVENTION

The field of the invention relates to a hydrothermal treatment process for preparing a high carbon concentration slurry formed with biosolids waste and biomass mixture that could be pumped in a pressurized condition.

BACKGROUND OF THE INVENTION

Biosolids (aka treated municipal sewage sludge), the residue produced from waste water treatment process, are produced at a rate of about 5.6 million dry tons per year (ton=2000 lb) in the United States (US) [1]. In general, dry weight per capita production of biosolid resulting from primary, secondary and even tertiary treatment is in average 90 g per person per day [2]. About 61% of the total biosolids currently produced in USA is disposed of through land farming, 17% disposed of in licensed municipal solid waste landfills, 20% incinerated, and about 1% disposed of in surface disposal units. This is by far the largest in volume among the constituents removed by the effluent treatment process; therefore, it's handling methods and disposal techniques are a matter of great concern.

The biosolids produced from the wastewater treatment process is usually in liquid or slurry form. The concentration of solids ranges between 0.25-25% solids by weight. The solid fraction varies between the above limits due to the different methods of the effluent treatment. In the municipal wastewater treatment plant, before disposal, the biosolids has to be treated to eliminate the bacteria, viruses and organic pollutants.

Recently, the sea disposal of sewage sludge has been prohibited, in order to protect the marine environment. The agricultural reuse as a fertilizer, incineration and land-filling has become the principal biosolid disposal method. The latest trends in the field of biosolid utilization are combustion, wet oxidation, pyrolysis, gasification and co-combustion of sewage sludge with other materials for further use as energy source as well as applications in some other areas such as forestry, land reclamation, etc. These applications have generated significant scientific interest. A previous invention of Steam Hydro-gasification technology [3] has been demonstrated to efficiently convert carbonaceous materials into syngas (a mixture of majorly CO and $H_2$). The application of such technology requires external water source and a careful control over the water to carbon ratio inside the feedstocks. Biosolids discharged from waste water treatment plants contains 70% to 97.5% of water based on from which process the biosolids is collected. Traditional disposal of the biosolids waste is costly and environmentally unfriendly. Therefore, a co-utilization of biosolids waste with wasted biomass can be carried out by co-gasification of both feedstocks. The transportation and feed of such feedstocks in pressurized gasification reactor is conventionally done by using dry feed (lock hoppers). While recently, it was widely acknowledged that slurry feed has several advantages over dry feed causing by its nature of operation (Table 1). So a hydro-thermal pretreatment process is invented here to convert the high carbon concentration biomass and biosolids mixture into a slurry formed feedstocks.

TABLE 1

Comparison of Feeding Methods in Pressurized Condition[4]

|  | Dry Feed (locker hopper) | Slurry feed |
|---|---|---|
| Method | Gas blow pressurization | Pump |
| System | Complex | Simple |
| Operation | Expensive | Economical |
| Duration | Unreliable | Reliable |

The biosolids produced from the wastewater treatment process is usually in liquid or slurry form. The concentration of solids ranges between 0.25-25% solids by weight. The solid fraction varies between the above limits due to the different methods of the effluent treatment. In the municipal wastewater treatment plant, before disposal, the biosolids has to be treated to eliminate the bacteria, viruses and organic pollutants.

There is a need to identify new sources of chemical energy and methods for its conversion into alternative transportation fuels, driven by many concerns including environmental, health, safety issues, and the inevitable future scarcity of petroleum-based fuel supplies. The number of internal combustion engine fueled vehicles worldwide continues to grow, particularly in the midrange of developing countries. The worldwide vehicle population outside the U.S., which mainly uses diesel fuel, is growing faster than inside the U.S. This situation may change as more fuel-efficient vehicles, using hybrid and/or diesel engine technologies, are introduced to reduce both fuel consumption and overall emissions. Since the resources for the production of petroleum-based fuels are being depleted, dependency on petroleum will become a major problem unless non-petroleum alternative fuels, in particular clean-burning synthetic diesel fuels, are developed. Moreover, normal combustion of petroleum-based fuels in conventional engines can cause serious environmental pollution unless strict methods of exhaust emission control are used. A clean burning synthetic diesel fuel can help reduce the emissions from diesel engines.

The production of clean-burning transportation fuels requires either the reformulation of existing petroleum-based fuels or the discovery of new methods for power production or fuel synthesis from unused materials. There are many sources available, derived from either renewable organic or waste carbonaceous materials. Utilizing carbonaceous waste to produce synthetic fuels is an economically viable method since the input feed stock is already considered of little value, discarded as waste, and disposal is often polluting.

Liquid transportation fuels have inherent advantages over gaseous fuels, having higher energy densities than gaseous fuels at the same pressure and temperature. Liquid fuels can be stored at atmospheric or low pressures whereas to achieve liquid fuel energy densities, a gaseous fuel would have to be stored in a tank on a vehicle at high pressures that can be a safety concern in the case of leaks or sudden rupture. The distribution of liquid fuels is much easier than gaseous fuels, using simple pumps and pipelines. The liquid fueling infrastructure of the existing transportation sector ensures easy integration into the existing market of any production of clean-burning synthetic liquid transportation fuels.

The availability of clean-burning liquid transportation fuels is a national priority. Producing synthesis gas (which is a mixture of hydrogen and carbon monoxide) cleanly and efficiently from carbonaceous sources, that can be subjected to a Fischer-Tropsch type process to produce clean and valuable synthetic gasoline and diesel fuels, will benefit both the transportation sector and the health of society. A Fischer-Tropsch type process or reactor, which is defined herein to include respectively a Fischer-Tropsch process or reactor, is any process or reactor that uses synthesis gas to produce a liquid fuel. Similarly, a Fischer-Tropsch type liquid fuel is a fuel produced by such a process or reactor. A Fischer-Tropsch type process allows for the application of current state-of-art engine exhaust after-treatment methods for $NO_x$ reduction, removal of toxic particulates present in diesel engine exhaust, and the reduction of normal combustion product pollutants, currently accomplished by catalysts that are poisoned quickly by any sulfur present, as is the case in ordinary stocks of petroleum derived diesel fuel, reducing the catalyst efficiency. Typically, Fischer-Tropsch type liquid fuels, produced from biomass derived synthesis gas, are sulfur-free, aromatic free, and in the case of synthetic diesel fuel have an ultrahigh cetane value.

Biomass material is the most commonly processed carbonaceous waste feed stock used to produce renewable fuels. Biomass feed stocks can be converted to produce electricity, heat, valuable chemicals or fuels. California tops the nation in the use and development of several biomass utilization technologies. For example, in just the Riverside County, California area, it is estimated that about 4000 tons of waste wood are disposed of per day. According to other estimates, over 100,000 tons of biomass per day are dumped into landfills in the Riverside County collection area. This waste comprises about 30% waste paper or cardboard, 40% organic (green and food) waste, and 30% combinations of wood, paper, plastic and metal waste. The carbonaceous components of this waste material have chemical energy that could be used to reduce the need for other energy sources if it can be converted into a clean-burning fuel. These waste sources of carbonaceous material are not the only sources available. While many existing carbonaceous waste materials, such as paper, can be sorted, reused and recycled, for other materials, the waste producer would not need to pay a tipping fee, if the waste were to be delivered directly to a conversion facility. A tipping fee, presently at $30-$35 per ton, is usually charged by the waste management agency to offset disposal costs. Consequently not only can disposal costs be reduced by transporting the waste to a waste-to-synthetic fuels processing plant, but additional waste would be made available because of the lowered cost of disposal.

The burning of wood in a wood stove is a simple example of using biomass to produce heat energy. Unfortunately, open burning of biomass waste to obtain energy and heat is not a clean and efficient method to utilize the calorific value. Today, many new ways of utilizing carbonaceous waste are being discovered. For example, one way is to produce synthetic liquid transportation fuels, and another way is to produce energetic gas for conversion into electricity.

Using fuels from renewable biomass sources can actually decrease the net accumulation of greenhouse gases, such as carbon dioxide, while providing clean, efficient energy for transportation. One of the principal benefits of co-production of synthetic liquid fuels from biomass sources is that it can provide a storable transportation fuel while reducing the effects of greenhouse gases contributing to global warming. In the future, these co-production processes could provide clean-burning fuels for a renewable fuel economy that could be sustained continuously.

A number of processes exist to convert coal and other carbonaceous materials to clean-burning transportation fuels, but they tend to be too expensive to compete on the market with petroleum-based fuels, or they produce volatile fuels, such as methanol and ethanol that have vapor pressure values too high for use in high pollution areas, such as the Southern California air-basin, without legislative exemption from clean air regulations. An example of the latter process is the Hynol Methanol Process, which uses hydro-gasification and steam reformer reactors to synthesize methanol using a co-feed of solid carbonaceous materials and natural gas, and which has a demonstrated carbon conversion efficiency of >85% in bench-scale demonstrations.

Of particular interest to the present invention are processes developed more recently in which a slurry of carbonaceous material is fed into a hydro-gasifier reactor. One such process was developed in our laboratories to produce synthesis gas in which a slurry of particles of carbonaceous material in water, and hydrogen from an internal source, are fed into a hydro-gasification reactor under conditions to generate rich producer gas. This is fed along with steam into a steam pyrolytic reformer under conditions to generate synthesis gas. This process is described in detail in Norbeck et al. U.S. patent application Ser. No. 10/503,435 (published as US 2005/0256212), entitled: "Production Of Synthetic Transportation Fuels From Carbonaceous Material Using Self-Sustained Hydro-Gasification."

In a further version of the process, using a steam hydro-gasification reactor (SHR) the carbonaceous material is heated simultaneously in the presence of both hydrogen and steam to undergo steam pyrolysis and hydro-gasification in a single step. This process is described in detail in Norbeck et al. U.S. patent application Ser. No. 10/911,348 (published as US 2005/0032920), entitled: "Steam Pyrolysis As A Process to Enhance The Hydro-Gasification of Carbonaceous Material." The disclosures of U.S. patent application Ser. Nos. 10/503,435 and 10/911,348 are incorporated herein by reference.

All of these processes require the formation of a slurry of biomass that can be fed to the hydro-gasification reactor. To enhance the efficiency of the chemical conversions taking place in these processes, it is desirable to have a low water to carbon ratio, therefore a high energy density, slurry, which also makes the slurry more pumpable. High solids content coal/water slurries have successfully been used in coal gasifiers in the feeding systems of pressurized reactors. A significant difference between coal/water slurries and biomass/water slurries is that coal slurries contain up to 70% solids by weight compared to about 20% solids by weight in biomass slurries. Comparing carbon content, coal slurries contain up to about 50% carbon by weight compared to about 8-10% carbon by weight in biomass slurries. The polymeric structure if cell walls of the biomass mainly consists of cellulose, hemicellulose and lignin. All of these components contain hydroxyl groups. These hydroxyl groups play a key role in the interaction between water and biomass, in which the water molecules are absorbed to form a hydrogen bond. This high hyrgroscopicity of biomass is generally why biomass slurries are not readily produced with a high carbon content.

A number of processes have been developed to produce high carbon content slurries for use as the feedstock for a hydro-gasifier. JGC Corporation in Japan developed the Biomass Slurry Fuel process, which, however must be carried out at semi-critical conditions, with a temperature of 310° C. and at a pressure of 2200 psi. The process converts high water content biomass into an aqueous slurry having a solids content of about 70%, which is the same level as a coal/water slurry. However, it has to be carried out under high energy conditions.

Texaco researchers developed a hydrothermal pretreatment process for municipal sewage sludge that involves heating the slurry to 350° C. followed by a two stage flash evaporation, again requiring high energy conditions.

Traditionally, thermal treatment of wood is a well known technology in the lumber industry to enhance the structural property of wood, but not to prepare a slurry. It decreases hygroscopicity and increases the durability of lumber for construction. Polymeric chains are cleaved in thermal treatment, and accessible hydroxyl groups are reduced leading to a limited interaction with water compared to untreated wood Aqueous liquifications of biomass samples have been carried out in an autoclave in the reaction temperature range of about 277-377° C. at about 725-2900 psi, to obtain heavy oils rather than slurries, exemplified by the liquification of spruce wood powder at about 377° C. to obtain a 49% liquid yield of heavy oil. See A. Demirbaş, "Thermochemical Conversion of Biomass to Liquid Products in the Aqueous Medium", *Energy Sources*, 27:1235-1243, 2005.

Our previous work (U.S. patent application Ser. No. 11/489,299) disclosed novel methods that enabled the production of a stable biomass slurry containing up to 60% solids by weight, so as to provide 20-40% carbon by weight in the slurry. However, it was not appreciated at that time the optimal conditions required for using such biomass slurries in hydrogasification processes, such as the optimum viscosity of the slurry to be delivered/pumped.

BRIEF SUMMARY OF THE INVENTION

Provided is a process for producing a high carbon content biomass and biosolid slurry using an optimum carbon to water mass ratio comprising providing an amount of biomass and an amount of biosolid to form a slurry mixture; and treating the mixture under a non-oxidative gas. In one embodiment, the biomass used in the process has not been treated with an external source of water. In another embodiment, the biomass and biosolid mixture is heated to a temperature in the range of 180 to 270° C., more particularly in the range of 210 to 240° C. and at a pressure of saturated water vapor pressure. In yet another embodiment, the optimum carbon to water mass ratio for the process is between 1:2 to 1:4; and more particularly at 1:3. In another embodiment, the high carbon content biomass and biosolid slurry produced is utilized in either a hydrogasifier or steam hydrogasifier.

In another embodiment, a process is provided that can produce a high carbon content biomass and biosolid slurry with a viscosity value of less than 1.5 under a shear rate of $102\ s^{-1}$; in a more particular embodiment, a viscosity of less than 1.0 pa·s under a shear rate of $102\ s^{-1}$ can be obtained.

Provided is a steam hydrogasification process efficient for gasification of both coal and biomass feedstocks, either alone or commingled. The process can utilize water to provide an internal source of hydrogen and to control the synthesis gas ratio over a wide range [3]. This requires the formation of a slurry with a high carbon to water ratio, but with a viscosity to allow ease of handling during preparation, storage and transfer to the reactor.

The present invention provides an energy efficient process for converting biomass into a higher carbon content, high energy density slurry. In particular, a coal water slurry is combined with a mixture of water and biomass, where the mixture is heated at a temperature and under a pressure that are much lower used in than prior processes, but under nitrogen, which enables a stable slurry to be obtained containing up to 60% solids by weight, so as to provide 20-40% carbon by weight in the slurry. While ranges will be given in the detailed description, the temperature is nominally about 200° C. under non-oxidative gas pressure of about 150 psi, conditions that are substantially less stringent than those required by the prior art.

In another embodiment, the coal slurry is provided in an amount whereby to obtain a viscosity of less than 0.7 Pas for the high energy density slurry.

In yet another embodiment the water to carbon ratio of the high energy density slurry is approximately 2:1. In a further embodiment, the water:carbon ratio of the high energy density slurry can be adjusted to 3:1.

BRIEF DESCRIPTION OF THE DRAWINGS

For a more complete understanding of the present invention, reference is now made to the following description taken in conjunction with the accompanying drawings, in which.

DETAILED DESCRIPTION OF THE INVENTION

A new process for a pumpable "slurry formed" biomass and bisolids mixture production has been devised. The goal of high carbon content in the pumpable biomass and biosolids slurry was achieved by hydrothermal treatment of biomass and bisolids mixtures at different mixing ratios. The mixtures were then hydrothermal treated under mild thermal condition (230° C.) and a pressure of 1500 psi. A reductive gas phase in head space of the vessel was maintained by pressurization of hydrogen, or other reductive or inert gas, before the hydrothermal treatment process. The vessel was impeller agitated inside for well mixing of mixture during hydrothermal treatment.

Figure 1:
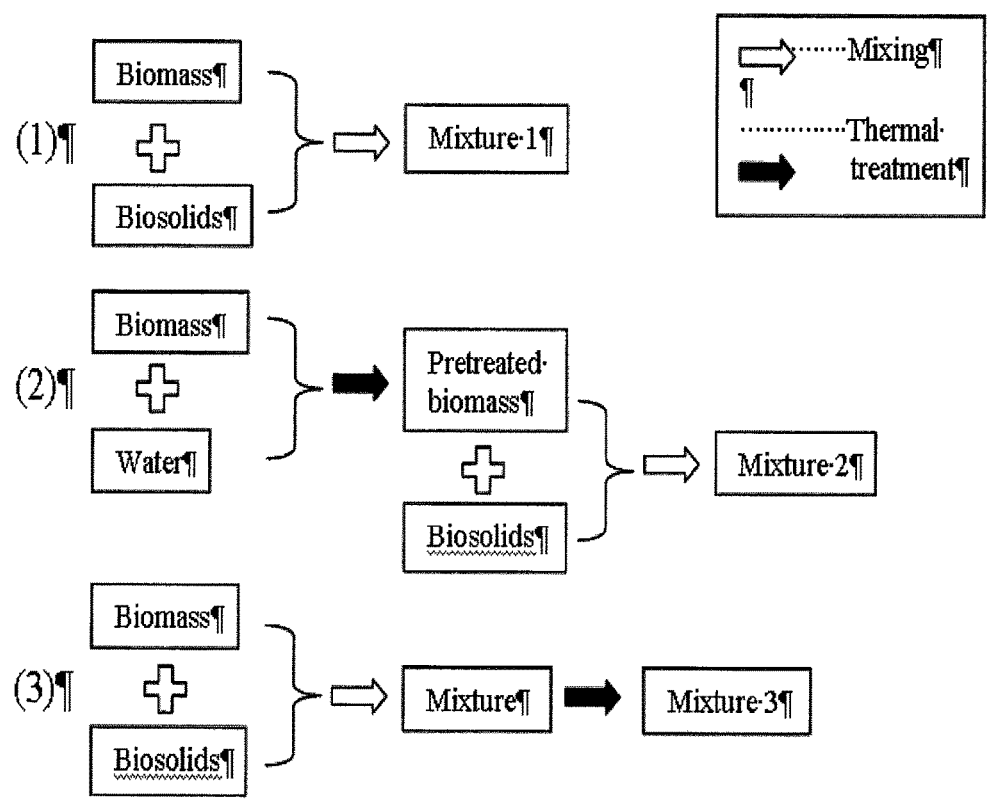
FIG. 1 shows a flow diagram for one embodiment of the invention regarding the mixing sequence of biomass and biosolids hydrothermal treatment

Three mixing sequences were tested as shown in FIG. 1. It was found that the third mixing sequence, which is to mix biomass with biosolids before hydrothermal treatment, gave the best result, it offered the highest carbon content in the pumpable biomass and biosolids slurry. It offered the simplest way of one mixing step for the hydrothermal treatment. It also offered direct utilization of water from biosolids without external source of water to make slurry.

In another embodiment, water rather than biosolids can be used.

In another embodiment, the biosolids used to be mixed with the biomass

Figure 2:
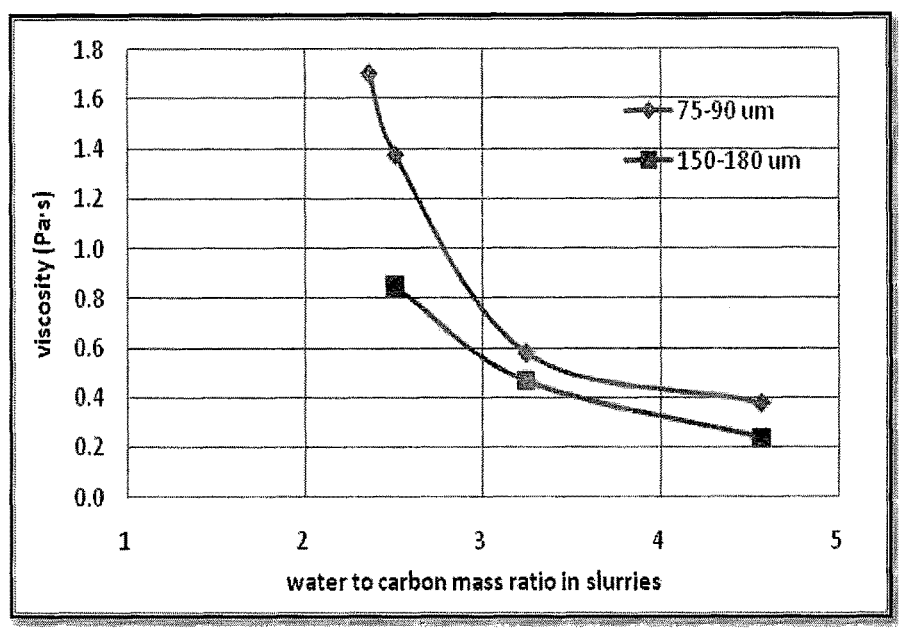
FIG. 2 shows a graph representing the viscosity value of pretreated biosolids and biomass under shear rate of $102\ s^{-1}$ vs. water to carbon mass ratio in resultant slurries: change of initial biosolids to biomass mass ratio and initial biomass particle size (pretreatment temperature of 240° C.).

Biomass was grinded and was then mixed with biosolids with different biomass to biosolids ratio. The control over carbon content in the biomass and biosolids slurries was carried out by mixing biomass with biosolids with different mass ratio. The resultant slurries were tested by its rheology properties, such as viscosity values for different shear rate values. It was found with initial biomass particle sizes of less than 180 um, a slurry with carbon to water ratio of over 1:2.5, equally 22.3 wt % of carbon in the slurry, was produced with a viscosity value of less than 1.0 pa·s under a shear rate of $102 \text{ s}^{-1}$ (FIG. 2).

Gas analysis was also carried out for the resultant exhaust gas to see how much carbon was lost through the gas phase after the hydrothermal treatment process. It was found a negligible amount of carbon present in the exhaust gas phase, no more than 1%. Most of the carbon was present in the gas phase in forms of $CO_2$ and CO, small amount of hydrocarbon with carbon numbers from 1 through 5 was also detected in the exhaust gas.

The above described high carbon content biomass and biosolid slurry produced by one embodiment can be used generally in hydrogasifiers or steam hydrogasifiers more particularly disclosed in U.S. Pat. No. 7,500,997 and U.S. application Ser. No. 11/879,266 (filed on Jul. 16, 2007), which are both hereby incorporated by reference in their entirety.

The term 'biomass" as used herein refers broadly to material which is, or is obtained from, agricultural products, wood and other plant material, and/or vegetation; paper and cardboard, or any combination thereof. The biomass at the desired weight percentage, generally from 30 to 70 wt %, is mixed with water, or diluted sewage sludge/biosolids, while at a temperature in the range of 170 to 250° C., most preferably about 200° C., under non-oxidative gas pressure of 100 to 400 psi, most preferably about 150 psi. The mixture can be placed in an autoclave at room temperature and ramped to the reaction temperature, or the vessel can be preheated to the desired temperature before being pressurized. The reaction temperature can range from 10 minutes to an hour or more.

In one embodiment, the biomass that is later to be mixed with water, or biosolids, does not undergo any prior drying or evaporation procedure to remove the water present in the biomass or to concentrate the biomass.

In another embodiment, the definition of biomass excludes sewage sludge or biosolids. However, 'diluted sewage sludge/biosolids' can serve as a source of water to be mixed and heated with the biomass under pressure in the presence of the non-oxidative gas. The term 'diluted sewage sludge/biosolids' means sewage sludge/biosolids material that have not been heated/dried to evaporate their water content. Such diluted sewage sludge/biosolids can contain from 70% to 97.5%, or 75% to 97.5%; 80-97.5%; 90-97.57% of water.

In another embodiment, biomass can include material from landfills.

In another embodiment, the biomass is not mixed with any water and then later condensed, or water evaporated, prior to being mixed with water/biosolids and heated in the disclosed process under the non-oxidative gas under pressure of 100 to 400 psi, most preferably about 150 psi.

In another embodiment, the biomass material used excludes material that have been treated to anerobic and aerobic conditions.

In another embodiment, the high carbon content biomass and biosolid slurry does not require being mixed with coal prior to utilizing such high carbon content biomass and biosolid slurry in a hydrogasifier or steam hydrogasifier.

In one embodiment, the water content of the mixture of biomass and water/biosolids, remains about the same after heating with the non-oxidative gas under pressure of 100 to 400 psi, most preferably about 150 psi. In another embodiment, the final water content of the mixture after heating with the non-oxidative gas under pressure of 100 to 400 psi, is within 40%; or 30%, or 20%, or 10% or 5% or 1% of the original mixture water content.

While any non-oxidative gas can be used, such as argon, helium, nitrogen, hydrogen, carbon dioxide, or gaseous hydrocarbons, or mixtures thereof, nitrogen is preferred because of its economic availability. Another preferred non-oxidative gas is hydrogen if available internally from the process, and which can be particularly advantageous if carried with the slurry into a hydro-gasification reactor. While it is desirable to eliminate oxidative gas, one can use a commercial grade, or less pure, of the non-oxidative gas so long as no substantial oxidation takes place.

The following examples will illustrate the invention.

EXAMPLE 1

Referring to FIG. 1, a non-pumpable mixture of 50% biomass, consisting of pine tree particles in water is shown before treatment. Dry pine sawdust was obtained from American Wood Fibers and the dry White Cedar from Utah. The sawdust was ground using a commercially available coffee grinder and sieved to <100 mesh (150 μm). For the wood pre-treatment, an autoclave system was set up. It consisted of an Autoclave Engineers EZE-Seal pressure vessel rated at 3,300 psi at 850° F. The wood sample and deionized water were weighed and then well mixed by hand to even water distribution in a large beaker before putting it in the vessel. The amount of wood added was adjusted for moisture content. The vessel was then weighed with contents, vacuumed and purged three times with argon, and finally pressurized to 100±1 psi. The temperature was ramped to operating temperature (210-230° C.) in about 30 minutes and then held for 30 minutes. Pressure and internal temperature were recorded using a data acquisition software. After holding for 30 minutes, application of the heat was stopped and the vessel was pulled out of the heater. The vessel was left to cool to room temperature to allow collection of head space gas and sample. Temperature and pressure were recorded before collection and then the vessel was weighed.

The result is shown in FIG. 2, which is a photograph of the slurry of FIG. 1 after treatment, which was a pumpable slurry containing 50 wt. % solids in water. Analysis of the head space gas showed negligible carbon, indicating negligible carbon loss from the slurry.

EXAMPLE 2

The procedure of Example 1 was followed but the vessel was preheated to >200° C. before being put in the heater. The autoclave was found to reach 230° C. in 15 minutes or less and then it was held for 30 minutes. The time needed to reach the target temperature did not have a noticeable physical impact on the resulting product

EXAMPLE 3

The method of Example 1 can be carried out but in which the starting mixture is non-pumpable agricultural waste containing 60 weight percent solids. The result will be a pumpable slurry containing 60 wt. % solids in water.

EXAMPLE 4

The method of Example 1 can be carried out but in which the starting mixture is vegetation containing nonpumpable 40 weight percent solids. The result will be a pumpable slurry containing 40 wt. % solids in water.

The slurry of carbonaceous material resulting from the process of this invention can be fed into a hydro-gasifier reactor under conditions to generate rich producer gas. This can be fed along with steam into a steam pyrolytic reformer under conditions to generate synthesis gas, as described in Norbeck et al. U.S. patent application Ser. No. 10/503,435, referred to above. Alternatively, the resultant slurry can be heated simultaneously in the presence of both hydrogen and steam to undergo steam pyrolysis and hydro-gasification in a single step, as described in detail in Norbeck et al. U.S. patent application Ser. No. 10/911,348, referred to above.

Examples Related to Commingling Biomass and Coal Slurries

Others have concluded that the rheological properties of coal-water slurries, such as shear stress and viscosity, are dependent on the type of coal, solid loading, coal particle size and size distribution, temperature, and additives [5-7]. Other studies have addressed biomass suspension and the effect of particle size on rheological properties of cellulosic biomass slurries [8]. However, biomass slurry rheological studies and its potential as a gasification feedstock when co-mingled with coal have not been reported.

Provided now are novel results obtained by examining the rheological properties and pumpability of various coal-water, wood-water, and commingled wood-coal-water slurries. The major factors considered are particle size, solid loading, viscosity, and a proprietary wood pretreatment procedure for the wood for the purpose of increasing the solid water ratio. Finally, the maximum solid content of co-mingled coal-wood slurries that are pumpable was evaluated.

At the time the above data was produced (for the above Examples 1-4) (as disclosed in U.S. patent application Ser. No. 11/489,299) it was not appreciated that the pumpability of our hydrogasification process would be obtained with a viscosity of less than 0.7 Pas. Given this previously undisclosed fact, and that the optimum water:carbon ratio of our process is 3:1, we set out to determine how the viscosities of our pretreated biomass slurries could be improved. The following experiments show that one method of improving pumpability of biomass slurries is to commingle biomass slurries with coal slurries.

EXAMPLE 5

Preparation of Coal and Wood Particles

Coal and wood particles were prepared from bituminous coal from Utah and poplar sawdust. Each material was initially ground and then pulverized in a pulverizing grinder. The pulverized particles were then sieved into three particle size ranges: 0-150 μm, 150 μm-250 μm and 250 μm-500 μm. The particles were then dried in a vacuum oven for vaporization of the moisture content at 70° C. The analysis of the solid content of the coal and wood particles after the vaporization process was determined by Thermometric Gravitation Analysis (TGA). The results of the TGA are presented in Table 1. Finally, particles were mixed with water to form numerous coal and wood slurries. The solid loading for coal-water slurries ranged from 40 wt. % to 65 wt. % by every 5% and 5 wt. % to 12.5 wt. % by every 2.5% for the wood-water slurries. Mixtures were settled overnight for complete mixing of the particles and water and were then gently stirred just before the rheological tests to avoid settlement of particles. Harsh stirring was avoided to prevent small air bubbles which would impact the rheological tests.

TABLE 1

|  | Coal particles | Wood particles |
| --- | --- | --- |
| Ash content (wt. %) | 7.6 | 0.6 |
| Moisture content (wt. %) | 4.0 | 5.75 |
| Volatile matter (wt. %) | 36.2 | 72.8 |

B. Pretreatment of Wood Slurry

In an actual working example, a portion of the prepared wood particles within the particle size of 150 μm-250 μm were pretreated using a proprietary method developed by our laboratory. The wood particles were mixed with water at solid weight percentages of 20 wt. %, 30 wt. %, and 40 wt. %. The mixtures were then heated at 230° C. at 100 psi of hydrogen for 30 min. The process was carried out in a sealed batch reactor; thus the difference in the solid content before and after the pretreatment was assumed to be negligible and was confirmed by thermal analysis of the biomass slurry after pretreatment. The 20 wt. % pretreated biomass slurry was then mixed with up to 35 wt. % of the 0-150 μm coal particles to form commingled biomass-coal-water slurries.

Although 20 wt % pretreated biomass slurry was mixed with up to 35 wt % of the 0-150 um coal particles, it is also possible to use 30 wt % or 40 wt % wood particle preparations. Further mixtures can be heated at a range of between 180-300° C. at between 100-1000 psi of hydrogen for between 10-45 minutes. Also, although 35 w % of the 0-150 um coal particles were used, it is possible to use instead 150 μm-250 μm and 250 μm-500 μm size particles.

C. Determination of the Slurry Rheological Properties

Rheological properties of slurries were determined by using an Anton Paar Reolab QC rotational rheometer with temperature control. The rotational rheometer is a coaxial-cylinder rheometer with the center rotor rotating at a defined speed or torque. A six-blade vane spinner with 1 inch outside diameter was utilized as the rotor. The reason for employing a vane spinner as the rotor is that the vane-cup system causes much less error when testing large particles and has less impact on the slurry structure [9].

Pump selection for handling slurries for industry applications is based on rheological data that are obtained from slurry rheology tests. The crucial parameters for pump selection are shear stress at certain shear rates, viscosity of the slurry, yield point, and settlement rate of the slurry. Other physical properties such as attrition and the friction of particles inside the slurry may also need to be considered for pump selection. The shear rate and shear stress curve of coal-water and wood-water slurry coordinates can be characterized by the Generalized Bingham Plastic model [10] as shown in Eq. 1. where $\tau$ is shear stress applied to the system when the shear rate of $\gamma$ is maintained. $\tau y$ is the yield stress of the starting slurry. K and n are empirical parameters determined by fitting the equation with experimental data. The correlation between shear rate and shear stress corresponds to a power law with constant coefficient of K. Thus, the viscosity of the slurry is defined as the slope of change in shear rate with a change in shear stress as given by Eq. 2. A change in viscosity can be obtained by either shear thinning or shear thickening. In shear thinning flow the viscosity decreases with increasing shear rate, while in shear thickening flow, viscosity increases with increasing shear rate.

$$\tau = \tau_y + K\gamma^n \quad \text{(Eq. 1)}$$

$$\mu = \frac{\Delta\tau}{\Delta\gamma} \quad \text{(Eq. 2)}$$

Results and Discussion of Experiment 5

A. Effect of Shear Rate on Viscosity

The effect of an increase in shear rate on slurry viscosity was evaluated for different particle sizes and solid loading for both coal-water and wood-water slurries. The relationship between shear rate and viscosity was obtained for different particle sizes for coal-water and wood-water slurries. The results are shown in FIG. 3 and FIG. 4, respectively. The solid loading in the coal-water and wood slurries was fixed at 60 wt. % and 10 wt. %, respectively.

Non-Newtonian shear thinning was observed for both coal-water and wood-water slurries. The viscosity of the coal-water slurries, shown in FIG. 3, decreased rapidly with increased shear rate up to 200 s$^{-1}$ but then reduced at a slower rate beyond 200 s$^{-1}$. Also, larger particle sizes had lower slurry viscosity. A similar trend was observed in wood-water slurries tests as seen in FIG. 4. The viscosity of wood-water slurries decreased rapidly with increased shear rates of up to 100 s$^{-1}$ but decreased at a slower rate beyond 100 s$^{-1}$. Similar to the coal-water slurries, the viscosity decreased with increasing particle size. A comparison of these two figures show that much higher shear thinning properties was observed for wood-water slurries. A possible reason may be that water is highly hydrogen bonded with wood particles. Therefore, higher shear stress was needed for wood-water slurries to maintain a same shear rate compared to coal-water slurries.

B. Effect of Solid Content

The maximum solid loading in coal-water and wood-water slurries varied for different particle size. When the maximum solid loading was exceeded, the mixture was not uniform as slurry and particles bound together to form larger particles. Table 2 shows the maximum solid loading for coal-water and wood-water slurries.

TABLE 2

Maximum solid loading in wood-water and coal-water slurries

|  | Maximum wood loading in slurry (wt. %) | Maximum coal loading in slurry (wt. %) |
| --- | --- | --- |
| 0-150 μm | 13% | 65% |
| 150 μm-250 μm | 13.5% | 66.5% |
| 250 μm-500 μm | 15% | 68% |

Experimental results for different solid loading on coal-water and wood water slurries are shown in FIG. 5 and FIG. 6, respectively.

It can be seen from FIG. 5 that the coal-water slurries changed from a shear thinning property to a shear thickening property as the coal-loading decreased from 50 wt. % to 45 wt %. The shear thickening property of coal-water slurry was rarely observed by other studies. S. K. Majumder reported [11] that the reason for the thickening was due to the emulsion-solids exhibiting dilatants flow behavior with low solid loading range. It is also seen that the viscosity of coal-water slurries increased with increasing solid loading. There was not much difference between slurries with solid loading of less than 55 wt. % for shear rates over 150 s$^{-1}$. Similar to the coal-water slurries, the viscosity of wood-water slurries also increased with increasing solid loading. However, at a shear rate over 100 s$^{-1}$, Newtonian fluid properties were observed at solid loading less than 7.5 wt. % and the viscosity increased slightly with increasing shear rate, as shown in FIG. 6.

C. Properties of Pretreated Wood-Water and Commingled Wood-Coal-Water Slurries

The effect of shear rate on viscosity in pretreated wood-water slurry was also evaluated. FIG. 7 shows the rheological properties of pretreated biomass slurries with weight percentages of 20%, 30% and 40%. Unlike the wood-water slurry before pretreatment, the viscosity profile of pretreated wood-water slurry dropped rapidly as shear rate increased from 10 s$^{-1}$ to 200 s$^{-1}$, then decreased slightly beyond 200 s$^{-1}$. The viscosity increased with increasing solid loading which is consistent with wood-water slurry before pretreatment. The important result is that with pretreatment there is an increase in the solid loading of wood-water slurry to 40% as compared to 12.5% before pretreatment. It is believed that presence of hydrogen under up to 230° C. and 100 Psi help break down the cellulose and semi-cellulose structure of wood which resulted in breaking the hydrogen bond between the wood and water. However, no analytical experiments were performed to confirm this.

FIG. 8 shows the comparison of the viscosity of slurries with increasing solid loading. It is clear that the pretreatment process greatly helped increase the solid content in wood-water slurry at a similar viscosity. At the same viscosity, the coal-water slurry had the highest solid content. The commingled coal in pretreated wood-water slurry had a solid content up to 55 wt. %.

D. Solid Loading of Pumpable Slurries

We have found that a viscosity of less than 0.7 Pas is preferred for easy pumping of slurries to our reactor. We successfully increased the solid loading in the wood-water slurry by using our pretreatment method while maintaining the viscosity. The solid loading of pretreated wood-water slurry under 0.7 Pas was less than 35%. We commingled the pretreated wood-water slurry with coal to increase its solid loading and carbon content. The results of viscosity with increased solid loading of coal-water, wood-water, pretreated wood-water and commingled coal-wood water slurries are shown in FIG. 8. It is shown that at 0.7 Pas viscosity, coal-water slurry had the highest solid loading of up to 65%, and wood-water slurry before pretreatment had the lowest solid loading of less than 12.5%. After pretreatment, the solid loading in wood-water slurry of 0.7 Pas increased to nearly 35% and when commingled with coal, the solid loading increased to nearly 45%. Closer investigation of the water to carbon ratio of these slurries further suggested that the commingled coal-wood water slurry provided a water to carbon ratio of 2:1. With our gasification process the optimized water to carbon ratio is 3:1. Thus, with pretreatment, the rheological properties of the commingled coal-wood water slurry are improved for use as a feedstock for gasification. Such commingled coal-wood water slurries can be adjusted with water to obtain the desired water:carbon ratio of 3:1.

Table 3 shows the results of mass based water to carbon ratio of different slurries at a viscosity of 0.7 Pas.

TABLE 3

Mass based water to carbon ratio of slurries (0.7 Pas viscosity)

| | coal-water slurry | wood-water slurry | pretreated wood-water slurry | commingled biomass-coal-water slurry |
|---|---|---|---|---|
| Ratio | 0.78 | 13.82 | 3.67 | 2.01 |

The viscosity plot of different water carbon ratio in commingled coal-wood water slurry is shown in FIG. 9. Under optimized water to carbon ratio of 3:1 for application as feedstock in gasification process, slurry viscosity is less than 0.45 Pas and provides good pumpability.

In conclusion, our results show non-Newtonian properties of slurries and shear thinning behavior for most cases except the coal-water slurries with a solid content below 45%. Comparison of the viscosity of slurries under shear rate of 100 $s^{-1}$ shows that thermal pretreatment increased the solid loading of wood-water and commingled coal-biomass-water slurries for the same viscosity values. Pretreatment of the commingled coal-wood slurries provided a pumpable slurry with a solid carbon content for optimum feed to the steam hydrogasification reactor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily, appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

REFERENCES ALL OF WHICH ARE INCLUDED BY REFERENCE IN THEIR ENTIRETY

[1] Burke, T. A. Biosolids Applied to Land, Advancing the Standards and Practice, National Research Council; The National Academies Press: Washington, D.C., 2002.

[2] Davis R D. The impact of EU and UK environmental pressures on the future of sludge treatment and disposal. J CIWEM 1996; 10:65-9.

[3] Raju, A. S. K., Park, C. S., Norbeck, J. M. Synthesis gas production using steam hydrogasification and steam reforming. Fuel Processing Technology: 2009: 90: 330-336.

[4] C. Higman, M., Van der Burgt. Gasification: 2008.

[5] V. P. Natarajan anad G. J. Supes, Rheological studies on a slurry biofuel to aid in evaluating its suitability as a fuel, Fuel, Vol. 76, 1997, pp. 1527-2535

[6] G. Atesok, F. Boylu, A. A. Sirkeci and H. Dincer, The effect of coal properties on the viscosity of coal-water slurries, Fuel, Vol. 81, 2002, pp. 1855-1858

[7] F. Boylu, H. Dincer and G. Atesok, Effect of coal particle size distribution, volume fraction and rank on the rheology of coal-water slurries, Fuel Proc. Tech., Vol. 85, 2004, pp. 241-250

[8] N. V. Pimenova and T. R. Hanley, Measurement of rheological properties of corn stover suspensions, App. Biochem. and Biotech., Vol. 105-108, 2003, pp. 383-392

[9] H. A. Barnes and Q. D. Nguyen, Rotating vane rheometry—a review, J. Non-Newtonian Fluid Mech. Vol. 98, 2001, pp. 1-14

[10] N. I. Heywood, Stop you slurries from stirring up trouble, Chem. Engr Proc. Vol. 95, 1999, pp 21-40

[11] S. K. Majumder, K. Chandna, D. S. De and G. Kundu, Studies on flow characteristics of coal-oil-water slurry system, Int. J. of Miner. Proc., Vol. 79, 2006, pp. 217-224

The invention claimed is:

1. A process for producing a pumpable high carbon content slurry comprising:
    providing a mixture of water and a material selected from the group consisting of an agricultural product, wood, plant, paper and cardboard, wherein the material comprises a weight percentage between 30 wt % to 70 wt % of the mixture;
    mixing the mixture with a residue produced from a waste water treatment process to form a slurry mixture; and
    heating the slurry mixture under a non-oxidative gas to thereby produce the high carbon content slurry.

2. The process of claim 1, wherein the non-oxidative gas is selected from the group consisting of argon, helium, nitrogen, hydrogen, carbon dioxide, or gaseous hydrocarbons, or mixtures thereof.

3. The process of claim 1 in which the slurry mixture is heated to the temperature having a range of 170 to 250° C.

4. The process of claim 1, wherein the slurry mixture is heated under the non-oxidative gas at a pressure of 100 to 400 psi.

5. A process for converting biomass into a higher carbon content slurry, consisting essentially of:
    grinding the biomass;
    mixing the biomass with water to thereby form a first mixture, wherein the biomass comprises a weight percentage between 30 wt % to 70 wt % of the first mixture;
    mixing the first mixture with a residue produced from a waste water treatment process to form a slurry mixture; and
    heating the slurry mixture under a non-oxidative gas to thereby produce the high carbon content slurry.

6. The process of claim 5, wherein the biomass is selected from the group consisting of an agricultural product, wood, plant, paper and cardboard.

7. The process of claim 5, wherein the non-oxidative gas is selected from the group consisting of argon, helium, nitrogen, hydrogen, carbon dioxide, or gaseous hydrocarbons, or mixtures thereof.

8. The process of claim 5, the slurry mixture is heated under the non-oxidative gas at a pressure of 100 to 400 psi.

* * * * *